United States Patent
Bae

(10) Patent No.: US 11,677,281 B2
(45) Date of Patent: Jun. 13, 2023

(54) DIVIDED CORE OF A MOTOR

(71) Applicant: LG Electronics Inc., Seoul (KR)

(72) Inventor: Jongwoo Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 16/774,389

(22) Filed: Jan. 28, 2020

(65) Prior Publication Data

US 2021/0066976 A1 Mar. 4, 2021

(30) Foreign Application Priority Data

Sep. 4, 2019 (KR) .................. 10-2019-0109496

(51) Int. Cl.
*H02K 1/14* (2006.01)
*A47L 5/28* (2006.01)
*A47L 9/22* (2006.01)
*A47L 9/28* (2006.01)

(52) U.S. Cl.
CPC ............... *H02K 1/146* (2013.01); *A47L 5/28* (2013.01); *A47L 9/22* (2013.01); *A47L 9/28* (2013.01)

(58) Field of Classification Search
CPC ..... A47L 5/28; A47L 9/22; A47L 9/28; H02K 1/146; H02K 1/148; H02K 3/345
See application file for complete search history.

(56) References Cited

U.S. PATENT DOCUMENTS

| 2007/0138876 A1* | 6/2007 | Evans | H02K 1/148 |
| | | | 310/10 |
| 2012/0098381 A1* | 4/2012 | Seki | H02K 15/095 |
| | | | 310/215 |
| 2016/0344270 A1* | 11/2016 | Katsuragi | H02K 3/18 |
| 2020/0033879 A1* | 1/2020 | Mushegian | A47L 9/2836 |

FOREIGN PATENT DOCUMENTS

| EP | 1499000 | | 1/2005 | |
| EP | 1499000 A1 * | | 1/2005 | ............ H02K 1/148 |
| JP | 2003250252 | | 9/2003 | |
| JP | 2004120958 | | 4/2004 | |
| JP | 2004120958 A * | | 4/2004 | |
| JP | 5627819 | | 11/2014 | |
| WO | WO2019093205 | | 5/2019 | |
| WO | WO-2019093205 A1 * | | 5/2019 | ............... H02K 1/18 |

OTHER PUBLICATIONS

Korean Office Action in Korean Application No. 10-2019-0109496, dated Aug. 25, 2020, 10 pages (with English translation).
Extended European Search Report in EP Appln. No. 20156595.9, dated Jan. 15, 2021, 8 pages.

* cited by examiner

*Primary Examiner* — Marc Carlson
(74) *Attorney, Agent, or Firm* — Fish & Richardson P.C.

(57) ABSTRACT

A divided core of a motor includes: a stator core comprising a plurality of core segments; a back yoke forming a circumference of the core segments; and teeth extending from the back yoke towards a radial direction of the back yoke, wherein the plurality of the core segments are disposed (Continued)

along an axial direction of the stator core, and there are some areas where the teeth are overlapped with each other when disposing the core segments.

20 Claims, 10 Drawing Sheets

DIVIDED CORE OF A MOTOR

CROSS-REFERENCE TO RELATED APPLICATIONS

This application claims priority to Korean Patent Application No. 10-2019-0109496 filed on Sep. 4, 2019 in Korea, the entire contents of which is hereby incorporated by reference in its entirety.

BACKGROUND OF THE DISCLOSURE

Field of the Disclosure

Embodiments of the present disclosure relate to a single-phase divided core configured to form a state of a motor.

Background of the Disclosure

A conventional motor is a device configured to realize a drive force by using an interaction between a stator and a rotor. The structure of the rotor and stator is basically well known and identical.

However, such a motor is categorized into diverse types based on the rotating principle of the rotor that is rotatable according to the interaction with the stator. Such a motor is often categorized into diverse types based on the type or phase of the electric power applied to a stator coil. In addition, the motor may be categorized into diverse types based on a winding method of the stator coil. As one example, the motor may be categorized into a direct current (DC) adjustable voltage motor and an alternating current (AC) 3-phase flow motor.

When describing a conventional structure of such the motor, the motor include a shaft forming a rotation axis; a rotor coupled to the shaft; and a stator fixed in a housing. The stator may be arranged around a circumference of the rotor, spaced a predetermined distance apart.

Teeth may be provided in the stator and coils are wound around the teeth to form a rotating field such that an electric interaction with the rotor may be caused to induce the rotation of the rotor.

The winding method of the coils may include a concentrated winding and a distributed winding. In the concentrated winding method, coils are concentratedly wound around one slot. In the distributed winding method, coils are dividedly wound around two slots.

The concentrated winding can reduce copper loss while saving the winding amount of the coils, compared with the distributed winding. However, the coils are likely to be too concentrated on the slot enough to cause big change of the magnetic flux density and increase core or iron loss, in other words, electricity loss of iron. Accordingly, the coils wound according to the concentrated winding method may be generally used in a small-sized motor.

Recently, the motor used in diverse electric home appliances (e.g., a hair drier, a vacuum cleaner or the like) tends to be minimized such that divided teeth may be used so as to smoothly wind the coils. The small-sized motor has a spatial restriction when the coils are wound around the teeth. Accordingly, after the coils are wound around the teeth, respective divided teeth are assembled so as to form the stator.

Such the divided teeth may include divided back yoke (see Korean Patent No. 10-1135251, registered on 3 Apr. 2012, hereinafter, Cited Reference 1) or divided back yoke and divided teeth (see Korean Patent No. 10-2002-0011819, published on 9 Feb. 2002, hereinafter Cited Reference 2).

Cited reference 1 discloses the divided core that may adjust concentricity by using the divided back yokes not forcibly fitted to each other but assembled to each other through coupling portions formed as protrusion such that a coupling surface of the protrusion becomes wide enough to facilitate close contact between the divided back yokes.

Cited reference 2 disclosures a stator core coupled to a back yoke including a plurality of slots, after teeth are fitted to a slot according to a designer's necessity.

However, it is difficult in Cited reference 1 to adjust the concentricity accurately, because the coupling surfaces of the protrusions are coupled to respective divided cores by bonding. Accordingly, core loss or counter-electric-motive force loss is likely to occur in respective coupling surfaces. Even in case of Cited reference 2, the distribution of the magnetic flux density is likely to be varied according to the number of the slots and the same problem with Cited reference 1 might occur in the coupling surface disclosed in Cited reference 2.

Cited reference 3 discloses a multi-layered core of a motor that forms one multi-layered core by connecting back yokes with each other via connecting portions provided to couple two neighboring divided cores to each other, so as to adjust centricity of a multi-layered core.

However, in case of Cited reference 3, magnetic resistance rises in a divided surface of the back yoke such that the efficiency of the motor may deteriorate. Similar to above-noted Cited reference 1, it is difficult to adjust the concentricity accurately because of the error that might occur in a coupling area when the back yokes contact with each other.

In addition, in case of Cited reference 1 through 3, a plurality of divided or cut-away surfaces may be formed such that it may be limited to keep the entire strength of the stator core. Especially, in the small-sized motor, the back yoke may be formed thin. However, when the cut-away surface is formed in the back yoke or a slot is formed by recessing a predetermined area of the back yoke, the thickness of the back yoke has to be increased more than needed to keep the strength.

Accordingly, it is needed to improve the structure of the divided core so as to keep the accurate concentricity, minimize the loss of the back electro-motive force by minimizing the cut-away surfaces where respective divided cores contact with each other and prevent the increase of the iron loss.

CITED REFERENCES

Patent References

Cited reference 1: Korean Patent No. 10-1135251 (registered on 3 Apr. 2012)
Cited reference 2: Korean Patent No. 10-2002-00118191135251, (published on 9 Feb. 2002)
Cited reference 3: Korean Patent No. 10-2015-0132717, published on 26 Nov. 2015)

SUMMARY OF THE DISCLOSURE

Accordingly, an object of the present disclosure is to address the above-noted and other problems and provide a divided core that may perform arrangement winding via automation equipment.

Another object of the present disclosure is to provide a divided core that may reduce core loss or back electro-motive force (BEMF) loss by minimizing a cut-away surface formed in the divided core.

A further object of the present disclosure is to provide a divided core that may enhance the concentricity of the back yoke and teeth provided therein.

A still further object of the present disclosure is to provide a divided core that may minimize magnetic resistance loss by minimizing divided surfaces formed in the teeth.

A still further object of the present disclosure is to provide a divided core that may enhance productivity by integrally forming a back yoke as one body.

Embodiments of the present disclosure may provide a divided core that is able to keep concentricity by providing no divided back yoke and secure a coupling force between the divided cores.

Embodiments of the present disclosure may also provide a divided core that is able to minimize magnetic resistance loss by minimizing a divided surface of the teeth and enhance productivity by integrally forming the back yoke of the divided core.

Embodiments of the present disclosure may also provide a divided core that is able to perform the arrangement winding by using automation equipment in a small-sized motor and prevent the coils from separating from the area where the coils are wound.

Embodiment of the present disclosure may also provide a divided core that is able to enhance concentricity and roundness when assembling the divided cores.

Embodiment of the present disclosure may also provide a divided core comprising a stator core comprising a plurality of core segments; a back yoke forming a circumference of the core segments; and teeth extending from the back yoke towards a radial direction of the back yoke, wherein the plurality of the core segments are disposed along an axial direction of the stator core, and there are some areas where the teeth are overlapped with each other when disposing the core segments.

The teeth may be formed higher than the back yoke and coils are wound around the teeth. The height of the teeth may be corresponding to the height of the stator core.

The teeth may comprise a main tooth extending from the back yoke; and divided teeth that are disposed on the main tooth. The total sum of the heights of the main tooth and the divided teeth may be corresponding to the height of the stator core. The height of the main tooth may be corresponding to the height of the back yoke.

The core segments may comprises first core segments configured to allow the divided teeth to be disposed on both sides of the main tooth, respectively; and a second core segment configured to allow the divided teeth to be disposed on one side of the main tooth, and two or more of the second core segments may be disposed on different side surfaces of the first core segment, respectively, to form the stator core.

The heights of the first and second core segments may be corresponding to the height of the stator core.

Embodiments of the present disclosure may also provide divided core comprising a stator core formed by disposing a plurality of single-cores thereon; a back yoke provided to form a circumference of the core segments; teeth extending from the back yoke towards a radial direction of the back yoke and configured to have coils wound there around; and an insulator configured to surround the teeth and insulate between the teeth and the coils, wherein the teeth are higher than the back yoke; and the insulator comprises a bent portion bent along an inner circumferential surface of the back yoke.

The height of the teeth may be corresponding to the height of the stator core. The bent portion may be bent while some area of the inner circumferential surface of the back yoke, and the height of the bent portion may be corresponding to the height of the teeth, and the bent portion may insulate between the coils and an inner circumferential surface of the stator core.

The teeth may comprises a main tooth extending from the back yoke; and divided teeth that are disposed on the main tooth, and the total sum of the heights of the main tooth and divided teeth is corresponding to the height of the stator core. The height of the main tooth may be corresponding to the height of the back yoke.

The core segment may form each phase of the single phase power motor, and comprises two or more core segments, each of the core segments having the divided teeth disposed on one side of the main teeth, and the stator core may be formed by disposing the core segments. The height of the teeth formed in the two or more core segments may be corresponding to the height of the stator core.

According to the embodiments, the divided core may perform arrangement winding via automation equipment.

Furthermore, the divided core may reduce core loss or back electro-motive force (BEMF) loss by minimizing a cut-away surface formed in the divided core.

Still further, the divided core may enhance the concentricity of the back yoke and teeth provided therein.

Still further, the divided core may minimize magnetic resistance loss by minimizing divided surfaces formed in the teeth.

Still further, the divided core may enhance productivity by integrally forming a back yoke as one body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Referring to the accompanying drawings, exemplary embodiments of the present disclosure will be described in detail. Regardless of numeral references, the same or equivalent components may be provided with the same reference numbers and description thereof will not be repeated.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. It will be understood that when an element is referred to as being "arranged on" another element, the element can be directly connected with the other element or intervening elements may also be present between them.

It will be understood that although the terms first, second, etc. may be used herein to describe various elements, these elements should not be limited by these terms. These terms are generally only used to distinguish one element from another.

Figure 1:
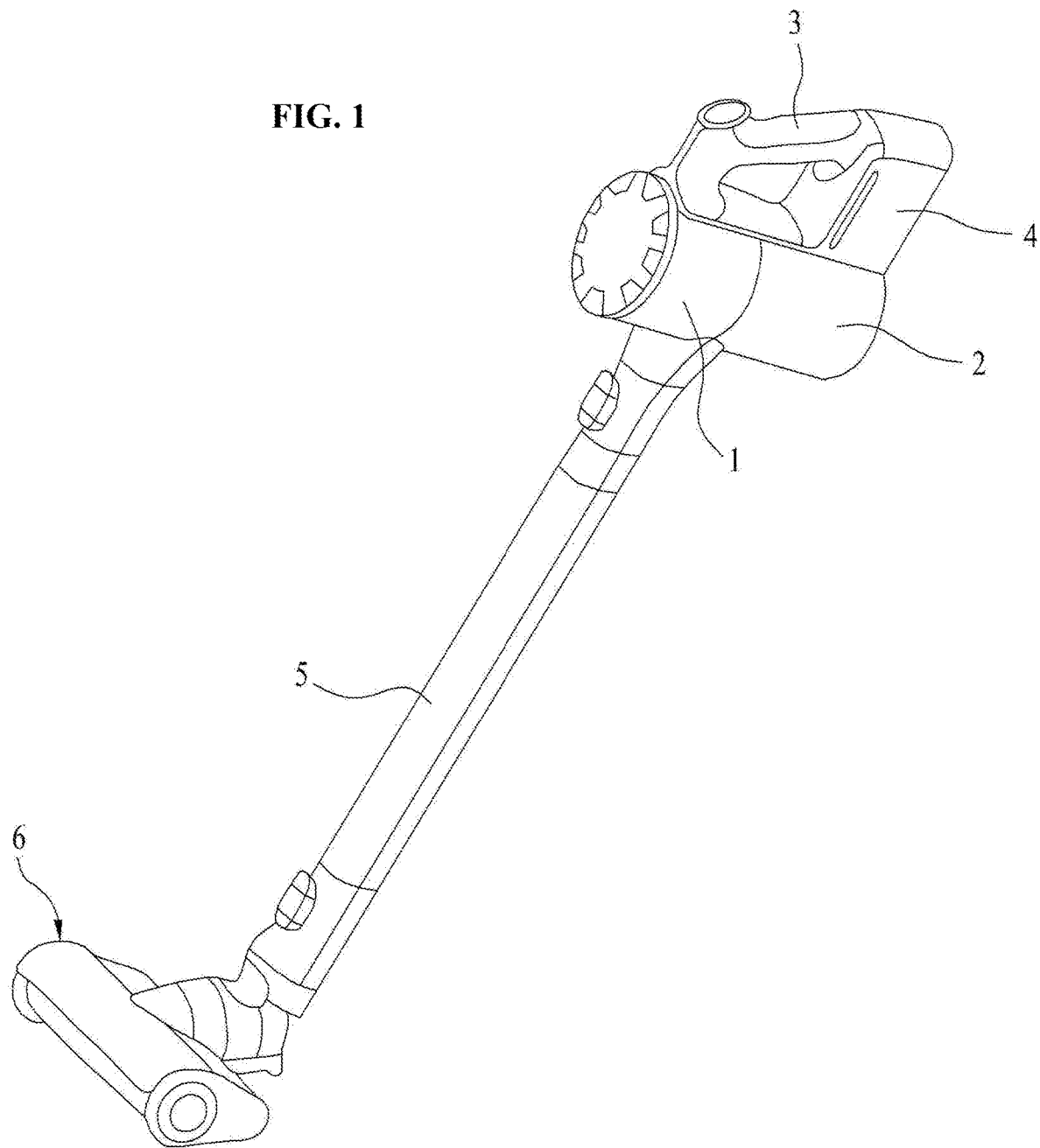
FIG. 1 is a perspective diagram of a vacuum cleaner.

FIG. 1 is a perspective diagram of a conventional vacuum cleaner.

Referring to FIG. 1, such a vacuum cleaner may include a cleaner body 1 having a motor configured to generate a suction force; and a suction nozzle 6 provided to suck the air including dust or dirt; and an eFIxtension pipe 5 provided to connect the cleaner body 1 and the suction nozzle 6 with each other.

Meanwhile, although not shown in the drawings, the suction nozzle 6 may be directly connected to the cleaner body 1 even without the extension pipe 5.

The cleaner body 1 may include a dust canister 2 provided to store the dust separated from air. Accordingly, the dust drawn via the suction nozzle 6 may be stored in the dust canister 2 after passing the extension pipe 5.

The cleaner body 1 may include a handle 3 provided to be held in the hand by a user. The user is able to perform vacuum cleaning in a state of holding the handle 3.

The cleaner body 1 may include a battery (not shown); and a battery receiving portion 4 formed to accommodate the battery (not shown). The battery receiving portion 4 may be provided in a lower area of the handle 3. The battery (not shown) may be connected to the suction nozzle 6 to supply electricity to the suction nozzle 6.

Figure 2:
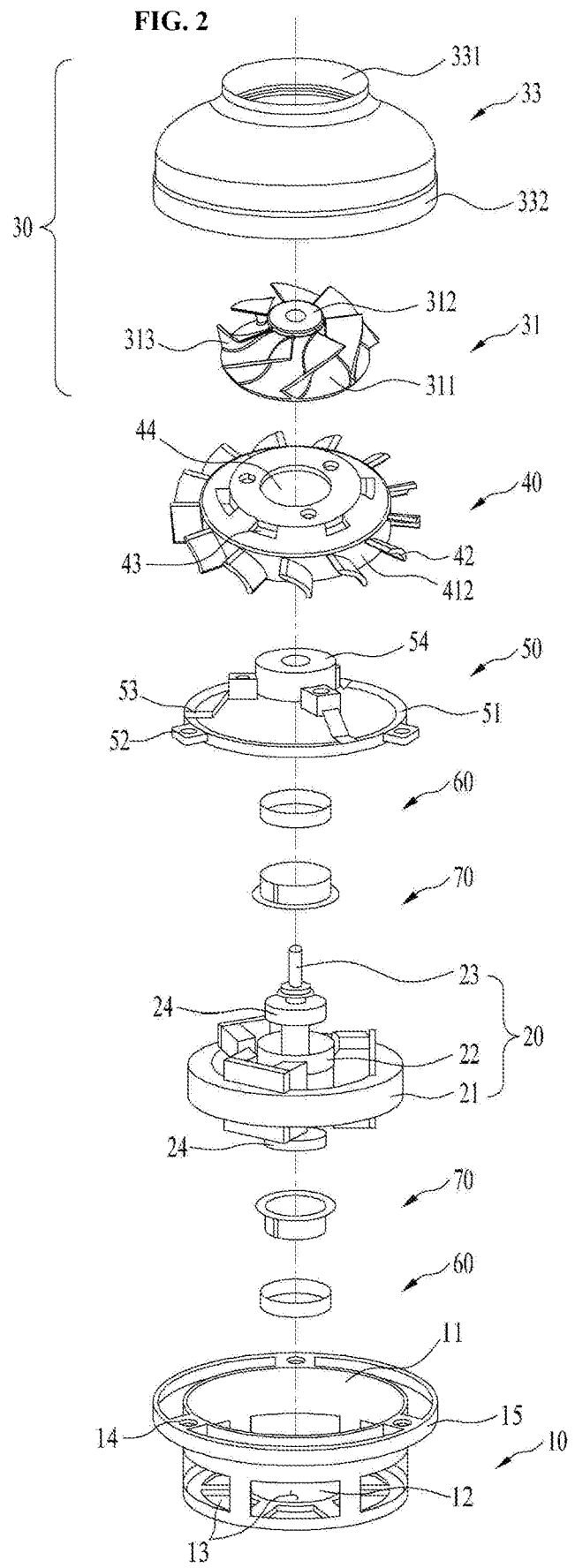
FIG. 2 is a block diagram of a motor.

FIG. 2 is a block diagram of a motor.

FIG. 2 illustrates an overall structure of the motor. Description about the divided core is made referring to FIGS. 3 through 10. The technical features of FIGS. 3 through 10 may be applied to the entire structure of the FIG. 2.

When describing the entire structure of the motor referring to FIG. 2, the motor includes a motor part 20; a housing provided to accommodate the motor part 20 and forming an overall frame of the motor; an air flow generator 30 installed in an upper area of the housing and configured to generate air flow; and a diffuser 40 configured to disperse the air flow generated in the air flow generator 30.

The motor part 20 includes a circular-shaped stator 21; a shaft 23 penetrating the center of the stator 21; and a rotor 22 coupled to the shaft 23 and configured to generate a rotation force together with the stator. The shaft 23 may be rotatably supported by a bearing 24.

The motor part 20 may be a brushless direct current motor (BLDC) as one example. The drawing illustrates a structure realized as BLDC that the stator 21 is arranged in an outer area of the rotor 22. However, the present disclosure may not exclude a motor structure that the stator 21 is arranged in an inner area of the rotor 22.

The motor housing 10 is provided in a lower area of the motor part 20 to define a predetermined space for accommodating the motor part 20. The motor housing 10 may include a motor installing portion 11 formed in a cylinder shape with an open top; a connection arm 14 outwardly extending from an upper end of the motor installing portion 11 in a radial direction; and a circular-shaped body coupling portion 15 having a larger diameter than a diameter of the motor installing portion 11. A bearing support portion 12 may be provided in a center of a bottom of the motor installing portion 11 to fixedly support the bearing 24 provided in the lower area of the motor part 20.

The bearing 24 may be a bearing assembly having a bearing holder 70 and a flexible mesh 60 wound around an outer circumferential surface of the bearing 24.

A bracket 50, the diffuser 40 and the air flow generator 30 may be provided in an upper area of the motor part 20. The air flow generator 30 may include an impeller 31 and an impeller cover 33.

The bracket 50 may include a center portion 54 arranged in a hole 45 formed in the center of the diffuser; and a support portion 51 formed in a circular shape, with a wider diameter than a diameter of the center portion 54. A connecting portion 53 may be formed to connect the center portion 54 and the support portion 51 with each other.

Also, the support portion 51 may include a coupling area 52 projecting in a radial direction to be coupled to the motor housing 10 so as to support an upper area of the motor part 20.

The diffuser 40 may have the hole 45 formed in the center, a plurality of cooling path outlets 43 provided along an outer circumferential surface of the hole 45 to form a path of the heat discharged from the motor part 20.

Meanwhile, a cylindrical portion 412 may be formed along a radial direction of the diffuser 40 to form an outer diameter corresponding to an outer diameter of a side wall of the motor installing portion 11. A plurality of vanes 42 may be provided along an outer circumferential surface of the cylindrical portion 412 to guide the air flow caused by the pressing of the impeller 3.

The impeller 31 may be installed in an upper area of the diffuser 40 and it may include a shaft hole 312 formed in the center to insert the shaft 23 therein. The shaft hole 312 may be formed in a hub 311 supporting the entire strength of the impeller 31. The hub 311 may be a mixed flow impeller having a surface that is downwardly inclined as getting farther from the center of the rotation in a radial direction and a blade 312 provided in a radial direction.

The impeller cover 33 may have an air inlet hole 331 and it may be downwardly titled with respect to the air inlet hole 333. A cover coupling portion 342 may be provided in a lower end of the impeller cover 33 and formed in a step such that the body coupling portion 15 may be insertedly fitted in the step.

Figure 3:
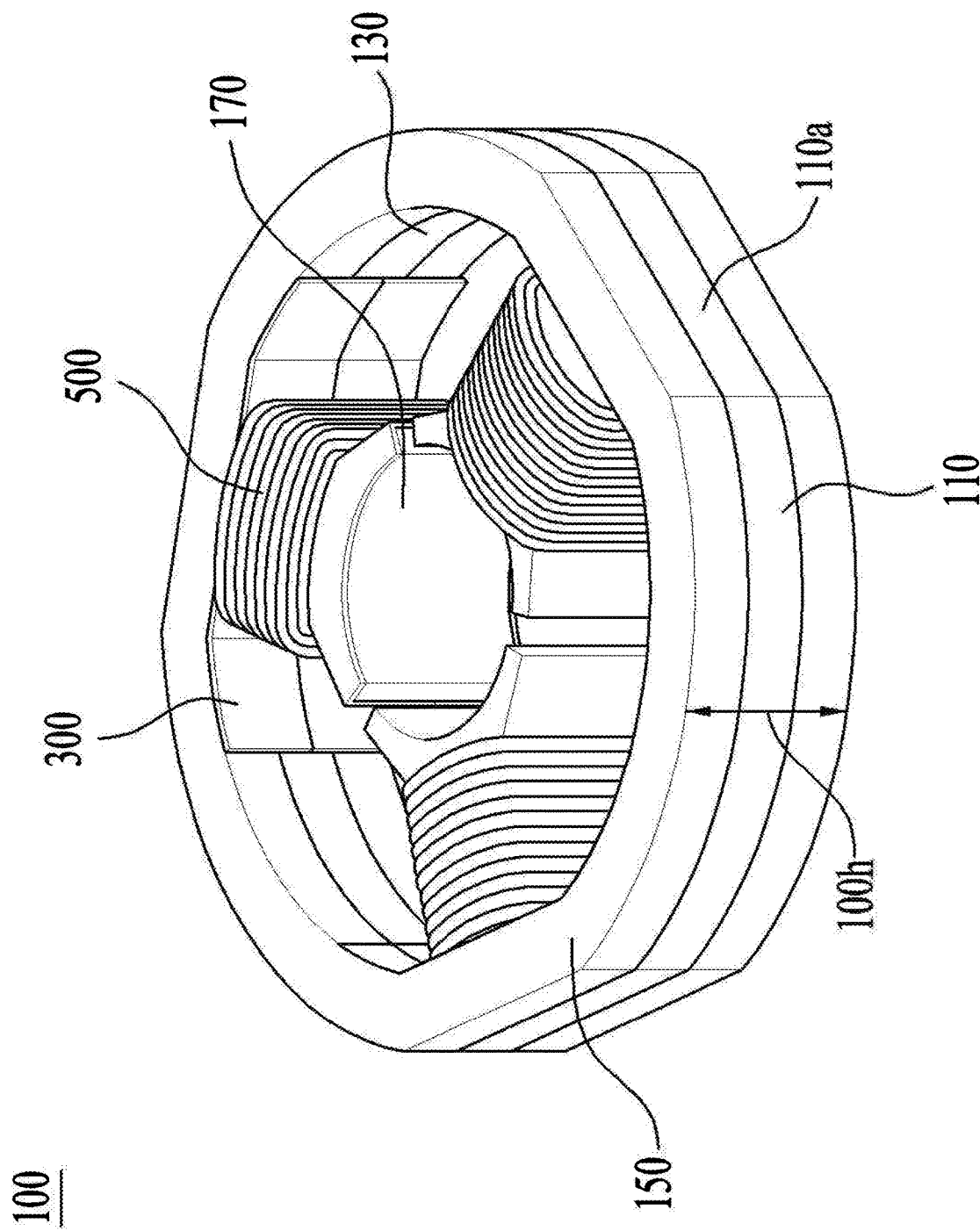
FIG. 3 is a perspective diagram of a stator core according to one embodiment of the present disclosure.
Figure 4:
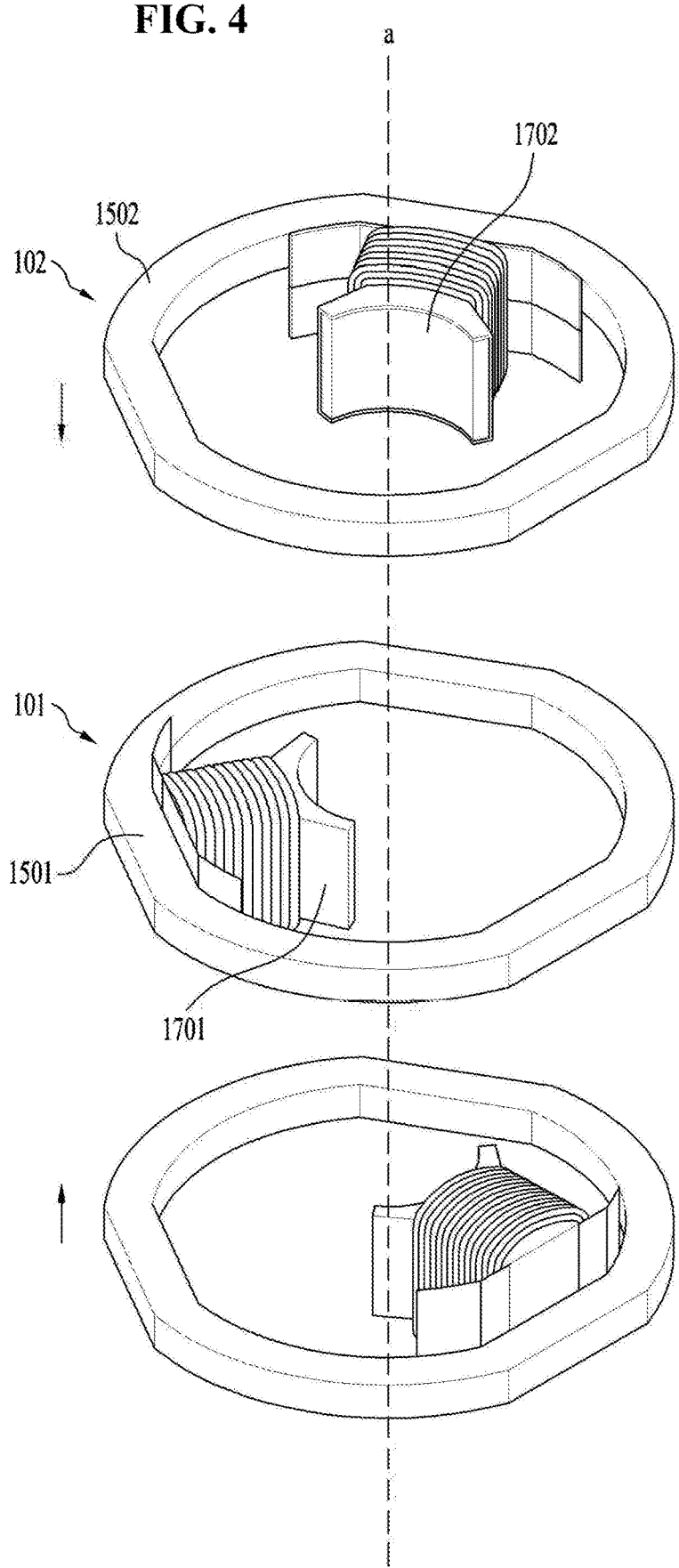
FIG. 4 is a perspective diagram of a divided core that forms the stator core shown in FIG. 3.
Figure 5A:
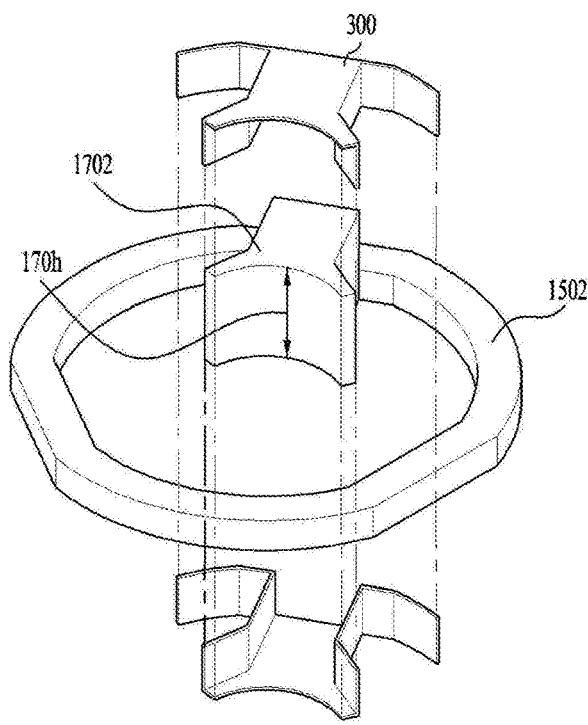
FIGS. 5A to 5C are diagrams to describe that an insulator is coupled to the divided core shown in FIG. 4 and coils are wound around the divided core.
Figure 5B:
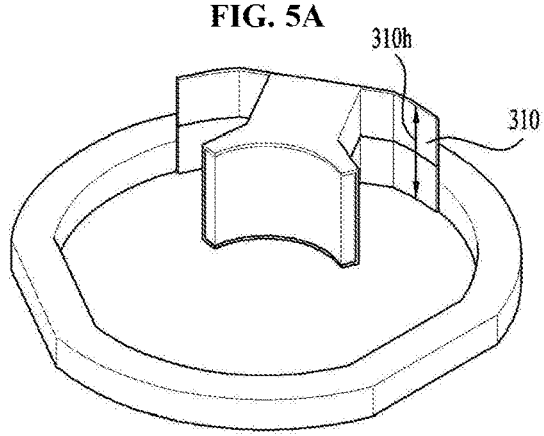
Figure 5C:
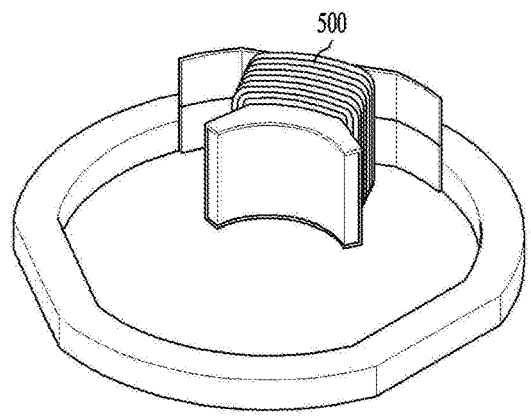

FIG. 3 is a perspective diagram of a stator core according to one embodiment of the present disclosure and FIG. 4 is a perspective diagram of a divided core that forms the stator core shown in FIG. 3. FIGS. 5A to 5C are diagrams to describe that an insulator is coupled to the divided core shown in FIG. 4 and coils are wound around the divided core.

In this embodiment, the arrangement winding and the concentrated winding may be applied to the teeth. A plurality of core segments may be multi-layered along an axial direction (or a longitudinal direction) of the stator core, so as to form the stator core. The size of the stator core might cause spatial limit of the small-sized motor and it might be difficult to couple the divided cores to the back yoke of the stator along a radial direction of the motor and to secure the space for winding the coils.

Here, the radial direction described in this embodiment means inner and outer areas with respect the radial direction of the stator as the stator core is provided in the cylinder shape. This embodiment is applicable to a small-sized motor generally used for the vacuum cleaner and examples of the small-sized motor include an inner type motor having teeth that are extending towards an inner area with respect to the radial direction of the back yokes.

The divided core according to this embodiment may mean core segments that form respective single phase corresponding to each phase of the 3-phase power. However, the core segment and the divided core may be combinedly used. A plurality of divided cores may be coupled to each other to form the stator core according to this embodiment and some of the divided cores may be equal to the cores forming the respective single phases of the 3-phase power, in the configuration and external design.

Referring to FIGS. 3 through 5C, the stator core 100 may include a plurality of core segments 101 and 102. The back yoke 150 of the stator core 100 may form circumferences of the core segments 101 and 102.

The stator core 100 may be formed in a cylinder shape having a predetermined space formed therein to receive the teeth 170. A flat portion 110a may be formed in some area of an outer circumferential surface 10 of the core 100 and the stator core 100 may be formed in the cylinder shape having some recessed area.

The flat portion 110a may minimize the motor by reducing the radial-direction thickness of the stator core 100 and improve the performance of the motor by partially removing the area that could act as resistance against the magnetic flux flowing in the stator core 100.

The flat portion may be provided in an inner circumferential surface 130 as well as the outer circumferential surface 110 of the stator core 100. Especially, the flat portion may be formed in a connecting area between the teeth 170 and the inner circumferential surface 130 of the stator core 100.

The back yoke 150 may be formed along an outer circumference of the stator core and back yokes of respective core segments 101 and 102 may be disposed as multi-layers to form the back yoke 150 of the stator core 100.

The teeth 170 may be extending from the back yoke 150 towards an inner area with respect to the radial direction of the back yoke 150 such that the stator core according to this embodiment may be realized as the inner type. The insulator 300 may surround the outer circumferential surface of the teeth and the coils 500 may be wound there around.

Meanwhile, the plurality of the core segments 101 and 102 forming the stator core 100 may be disposed along an axial direction (a) of the stator core 100 as the multi-layers. When disposing the stator core 100, there may be no overlapped area between the teeth.

In other words, each of the core segments may form one phase of the 3-phase power and the core segments may be coupled to each other as the multi-layers. Accordingly, the teeth of the core segment may be arranged in the inner circumferential surface of the stator core at intervals of 120 degrees.

However, it is not necessary to arrange the teeth in the inner circumferential surface of the stator core at the intervals of 120 degrees. A plurality of teeth may be provided according to a designer's plan. In this case, the positions of the teeth spaced apart from each other may be different from each other. however, even in this case, the core segments may be the cores that complete one phases, respectively, when forming the stator core by disposing the single-phases as multilayers, the teeth extended from the respective core segments may be provided in position that will not interfered with.

The core segments may include a first core segment 101 and a second core segment 102. According to this embodiment, the second core segment 102 may be disposed on each of the top and bottom of the first core segment 101 along an axial direction (a) of the stator core.

The first core segment 101 may include teeth 1701 that are extending towards the top and bottom of the back yoke 1501. In other words, the back yoke 1501 may form a circumference of the first core segment 101 at a middle height area of the teeth 1701.

The second core segment 102 may include teeth 1702 extending towards the top or bottom of the back yoke 1502. In other words, the back yoke 1502 may form a circumference of the second core segment 102 at one end of the teeth 1702.

The back yoke 1501 of the first core segment 101 may form an interlayer of the back yoke 150 provided in the stator core 100. The second core segments 102 are disposed on different side surfaces of the first core segment 101, only to form the stator core 100.

In the manufacturing process, the first core segment 101 is different from the second core segment 102 in the area where the back yoke is positioned. The second core segments 102 disposed on the top and bottom of the first core segment 101 may be formed in the same shape.

However, the first core segment and the second core segments are not necessarily different from each other from the manufacturing process. The unit cores may be manufactured in the same shape by a configuration of divided teeth 173 and main teeth 171, which will be described later, and the first core segment and the second core segments may be distinguished from each other according to the area where the divided teeth 173 are disposed on the main teeth 171.

FIGS. 5A to 5C illustrate the insulator 300 that is coupled to the second core segment 102 to wind the coils 500 there around. The insulator 300 may surround the teeth from the bottom to the top to insulate the winding area of the coils 500.

The teeth may be higher than the back yoke and the height (170h) of the teeth may be corresponding to the height (100h) of the stator core 100. Accordingly, when winding the coils 500 around the teeth 170 in the unit core, the coils might separate from the area of the teeth that is not in contact with the back yoke.

To prevent the separation of the coils during the winding process, the insulator 300 may include a bent portion 310 bent along an inner circumferential surface of the back yoke 150 to form one end of the area where the coils are wound.

The height (310h) of the bent portion 310 may be corresponding to the height (170h) of the teeth so as to insulate the coils 500 from the inner circumferential surface 130 of the stator core. The bent portion 310 may form one end of the area of the teeth 170 where the coils 500 are wound.

Figure 8:
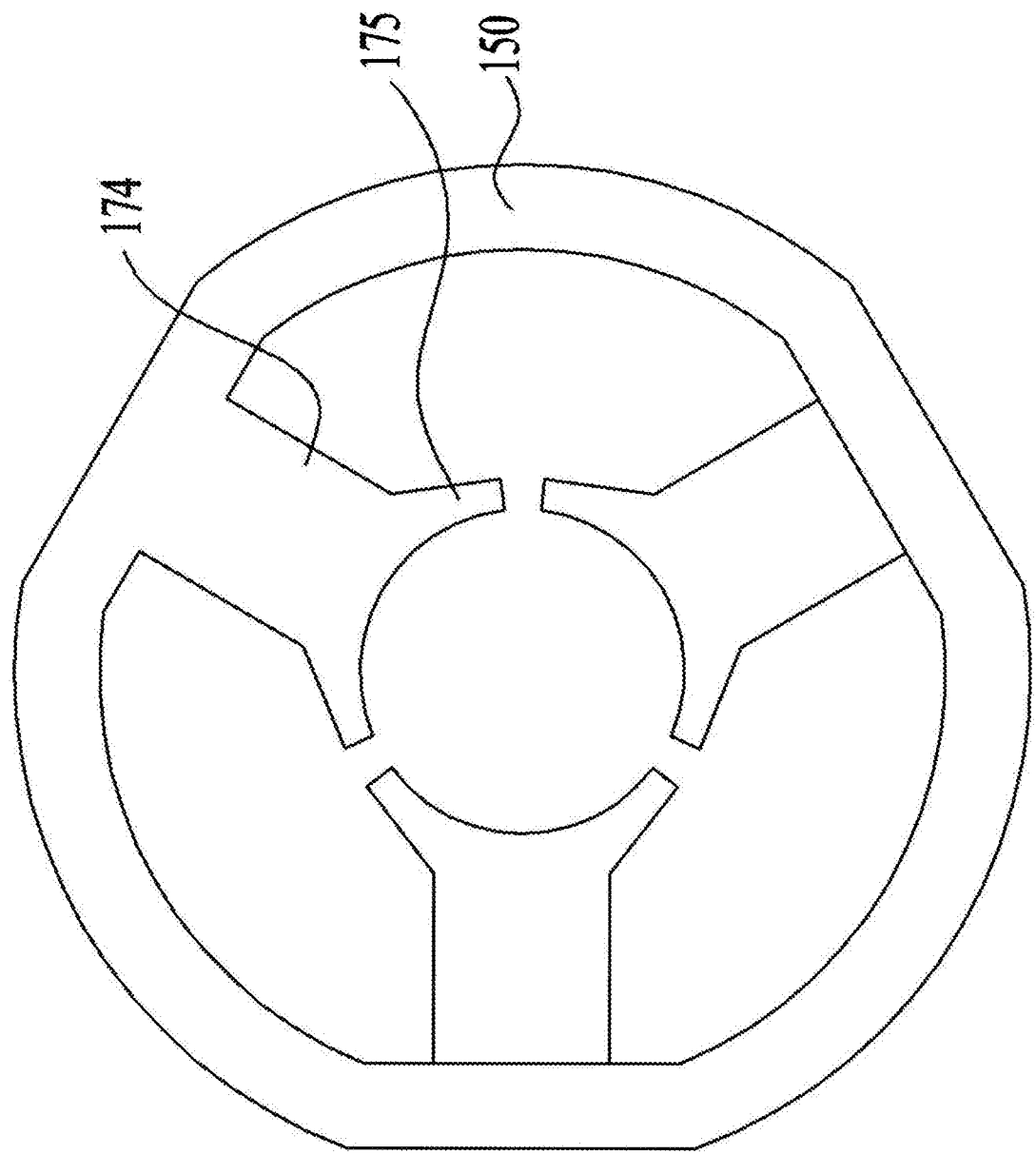
FIG. 8 is a top view of FIG. 8.

Referring to FIG. 8, the teeth 170 may include winding portion 174 forming the winding area of the coil; and a pole shoe 175 extending along a virtual circumferential surface inside the stator core 100 to define a predetermined space in the virtual circumferential surface for receiving the rotor. The pole shoe 175 and the bent portion 310 are provided to prevent the coils 500 from separating from both ends of the winding area.

Referring to FIGS. 5A to 5C, the winding process of the divided cores having the above-noted structure will be described. The insulator 300 is coupled to the teeth 1702 of the divided core to surround the winding portion 174 of the teeth 1702, some area of the pole shoe 1702 extending from the winding portion 174 and some area of the inner circumferential surface of the back yoke 1502. As mentioned above, the height (170h) of the teeth and the height of the bent portion (310h) may be equal to the height (100h) of the stator core.

If the bent portion 310 is provided only to prevent the coils 500 from separating from the winding area, the height (310h) of the bent portion need not be equal to the height (100h) of the stator core.

However, the drive of the motor will not be performed smoothly unless the insulation between the coils 500 and the inner circumferential surface 130 of the stator core is secured. It is preferred that the height of the bent portion 310 is corresponding to the height (100h) of the stator core.

Meanwhile, once the insulator 300 is coupled to the teeth 1702, the coils 500 may be wound around the teeth to form the core segment configured to form one divided core or one of the 3 phases. The core segment shown in FIGS. 5A to 5C may be the second core segment 102 formed by the back yoke 1502 forming the circumference of the single-phase at one end of the teeth 1702.

Figure 6A:
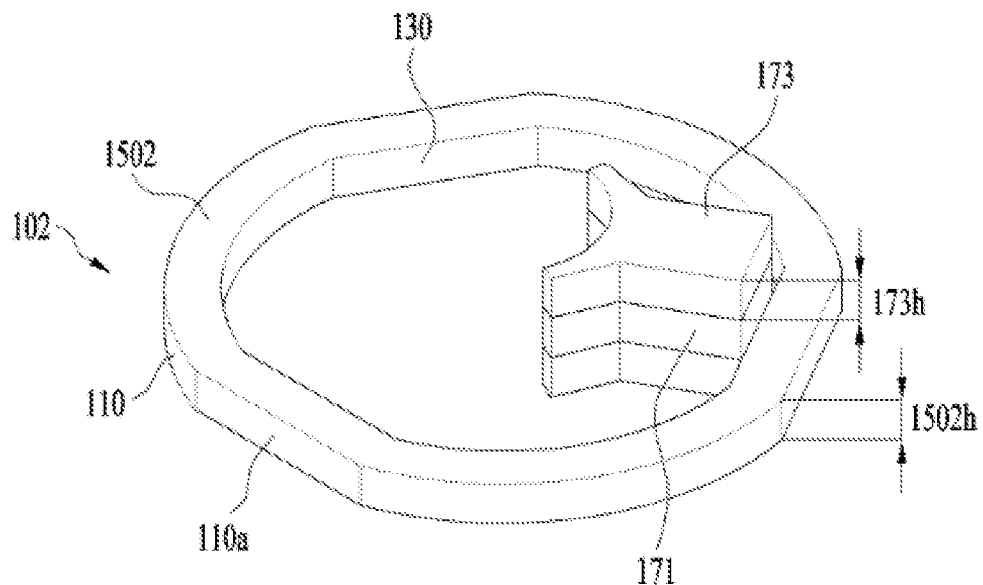
FIGS. 6A and 6B are a perspective diagram of a core segment shown in FIG. 4.
Figure 6B:
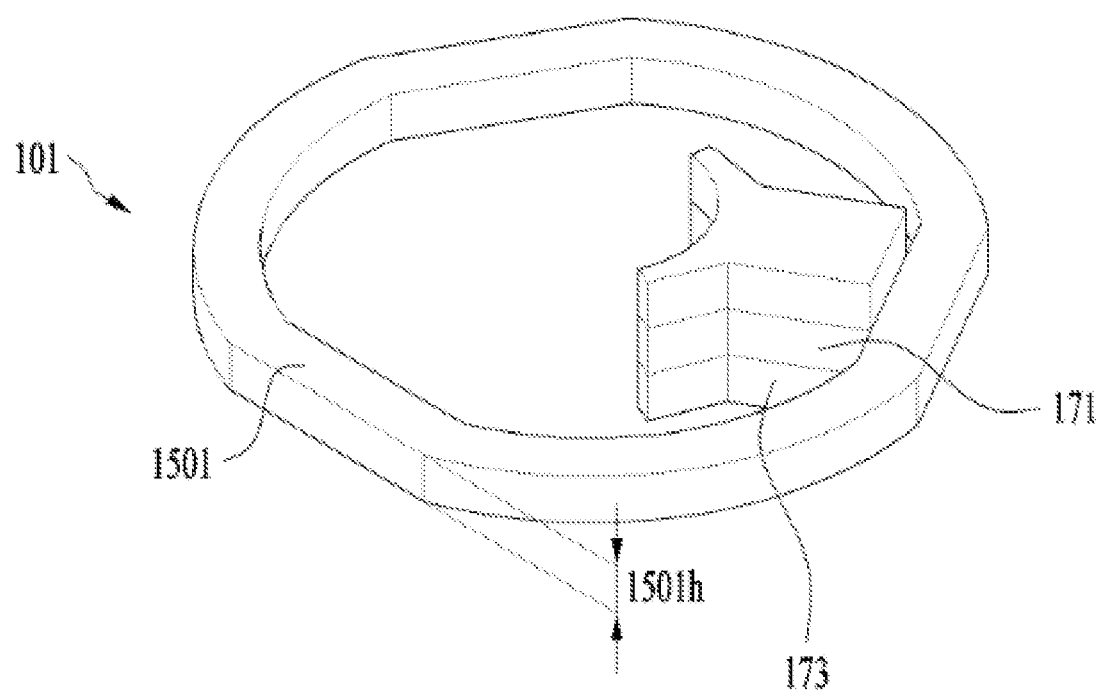
Figure 7:
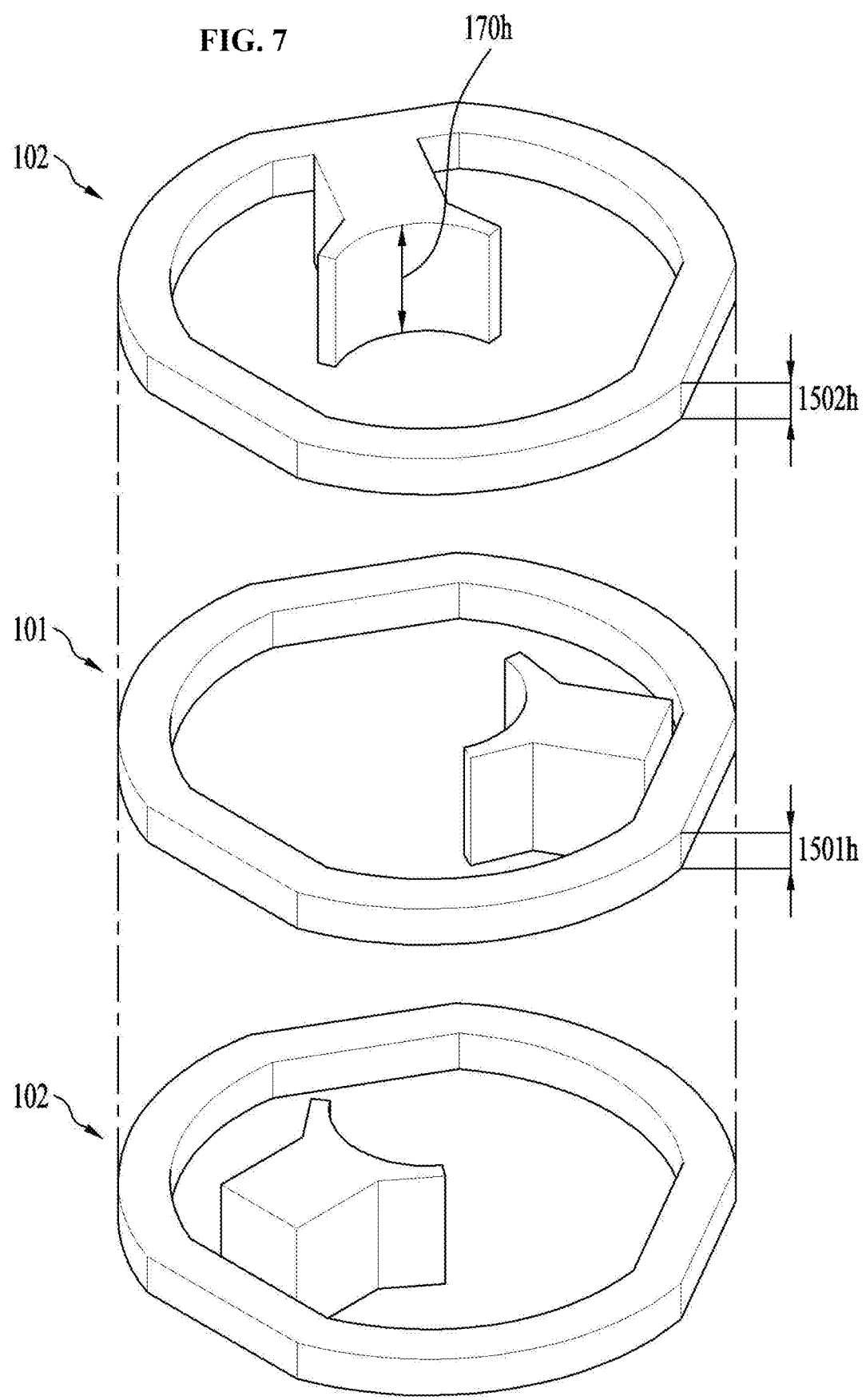
FIG. 7 is a perspective diagram of the divided core shown in FIG. 4, except the insulator and the coil.
Figure 9:
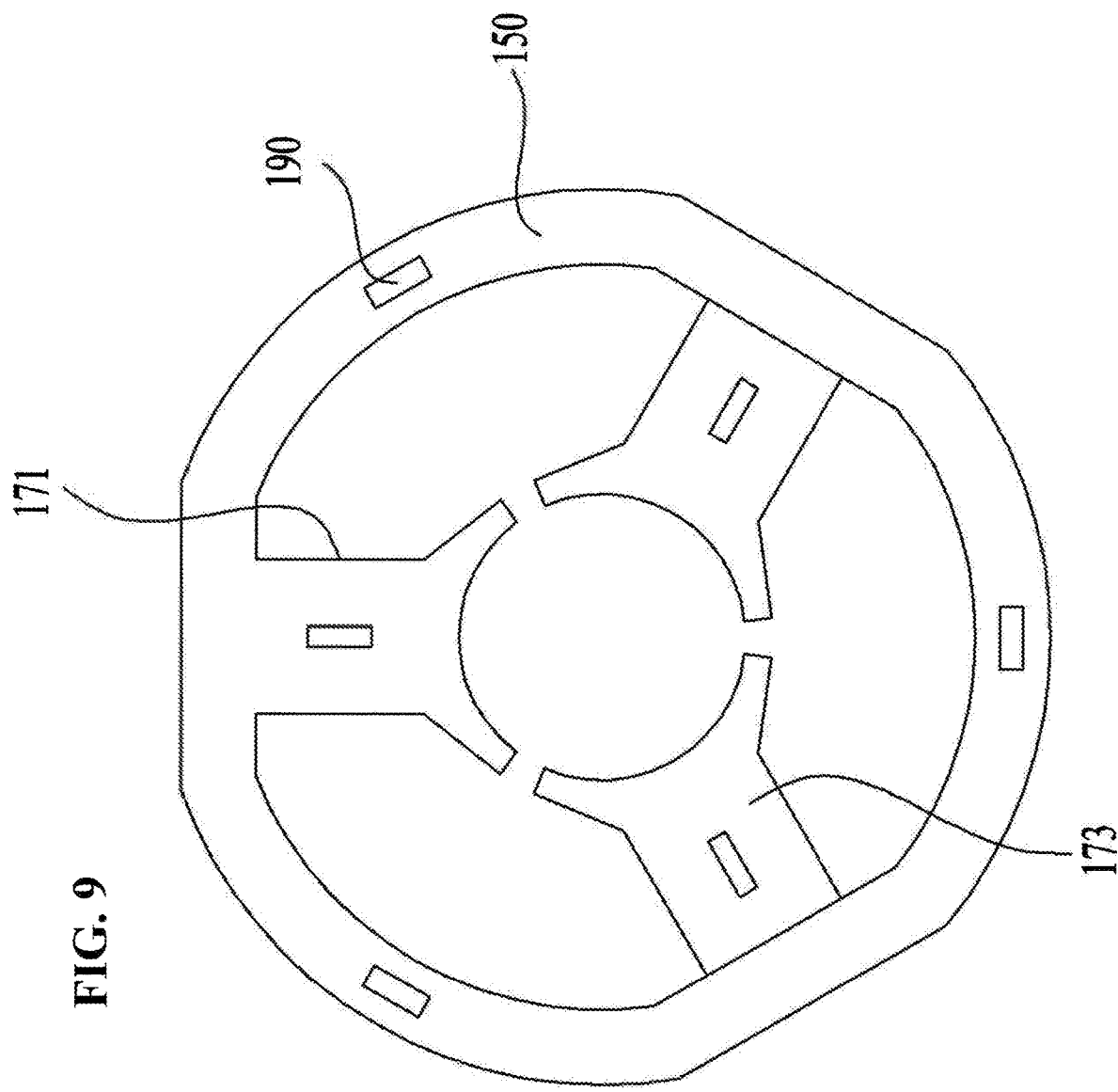
FIG. 9 is a diagram illustrating a caulking shown in FIG. 8.

FIGS. 6A and 6B are perspective diagrams of a core segment shown in FIG. 4 and FIG. 7 is a perspective diagram of the divided core shown in FIG. 4, except the insulator and the coil. FIG. 8 is a top view of FIG. 8 and FIG. 9 is a diagram illustrating a caulking shown in FIG. 8.

FIG. 6A is a diagram illustrating the second core segment 102 and FIG. 6B is a diagram illustrating the first core segment 101.

The height of the second core segment 102 according to this embodiment may be equal to the height (1502h) of the back yoke 1502 as mentioned above. The second core segment 102 may include a main tooth 171 extended from the back yoke 1502 towards an inner area with respect to a radial direction; and divided teeth 173 disposed on one side of the main tooth 171 as multilayers.

The height of the first core segment 101 according to this embodiment may be equal to the height (1501h) of the back yoke 1501 as mentioned above. The first core segment 101 may include a main tooth 171 extended from the back yoke 1502 towards an inner area with respect to a radial direction; and divided teeth 173 disposed on both sides of the main tooth 171 as multilayers.

The divided teeth 173 may be fabricated as two pieces and disposed on the main tooth 171. That is because the back yoke 1502 and the main tooth 171 extended from the back yoke 1502 may be fabricated by using the same frame. The divided teeth 173 may be also fabricated by using the same frame. When the divided teeth 173 are sequentially disposed on one side of the main tooth 171, the second core segment 102 may be formed. When the divided teeth 173 are disposed on both sides of the main tooth 171, respectively, the second core segment 102 may be formed.

Accordingly, the total sum of the heights of the main tooth 171 and the divided teeth 173 may be corresponding to the height (100h) of the stator core 100.

However, the present disclosure is not limited to the above-noted embodiment. Alternatively, the divided teeth 173 disposed on the main tooth 171 formed in the second core segment 102 may be integrally formed with the divided teeth so as to minimize a contact surface (or a divided surface) between the divided teeth 173 and the main tooth 171. Even in this instance, the sum total of the height of the divided teeth and the main tooth may be corresponding to the height (100h) of the stator core. That is because the divided surface is likely to have the back electro-motive force loss.

Specifically, to enhance the productivity as mentioned above, the divided teeth having the same shape may be fabricated and the unit cores may be distinguished from each other according to the location of the divided teeth disposed as the multilayers. To enhance the efficiency of the motor, the divided teeth disposed on the main tooth of the first core segment and the divided teeth disposed on the main tooth of the second core segment may be independently fabricated so as to minimize the divided surface.

Referring to FIG. 9, a plurality of caulking portions 190 may be formed in the main tooth 171, the divided teeth 173 and the back yoke 150. The caulking areas 190 formed in the main tooth 171 and the divided teeth 173 may fixedly couple the main tooth 171 and the divided teeth 173 to each other. The caulking portions formed in the back yoke 150 may fixedly couple the first core segment 101 and the second core segment 102 to each other.

The fixedly coupling between the divided teeth and the main tooth and between the core segments is not necessarily facilitated by the caulking portions. Alternatively, the respective contact surfaces may be bonded to enhance the coupling force or the coupling positions of the respective teeth may be aligned and bonded to each other.

Referring to FIG. 7, the teeth of the first and second core segments 101 and 102 may be formed by disposing the divided teeth 173 on the main tooth 171 as mentioned above.

The teeth 1701 of the first core segment 101 may be formed by disposing the divided teeth on the top and bottom of the main tooth 171. The teeth 1702 of the first core segment 102 may be formed by disposed one divided tooth disposed on one side of the main tooth 171, with the same height with the heights of the two divided teeth disposed on the first core segment 101.

Alternatively, the teeth of the first and second core segments 101 and 102 may be injection-molded so as to have no divided surface, while they are configured as single structure.

As mentioned above, the heights (170h) of the first and second core segments may be equal to the height (100h) of the stator core. The heights (150ah and 1502h) of the back yokes formed in the core segments may be the same. The sum total of the heights of the back yokes may be equal to the height (100h) of the stator core.

Referring to FIG. 8, a top view of the stator core according to this embodiment will be described. Compared with the stator forming the unit core configured to divide the yoke, the stator core according to this embodiment may have no divided surface formed in the back yoke so as to secure the strength or prevent iron loss and also adjust the concentricity accurately when coupling the respective unit cores to each other.

Compared with the stator forming the unit core configured to divide the teeth and the stator core, the stator core according to this embodiment is able to reduce the divided surface formed between the teeth and the stator core by one third and minimize the bonding for the coupling between the teeth and the stator core such that the above-noted effects can be achieved.

Figure 10:
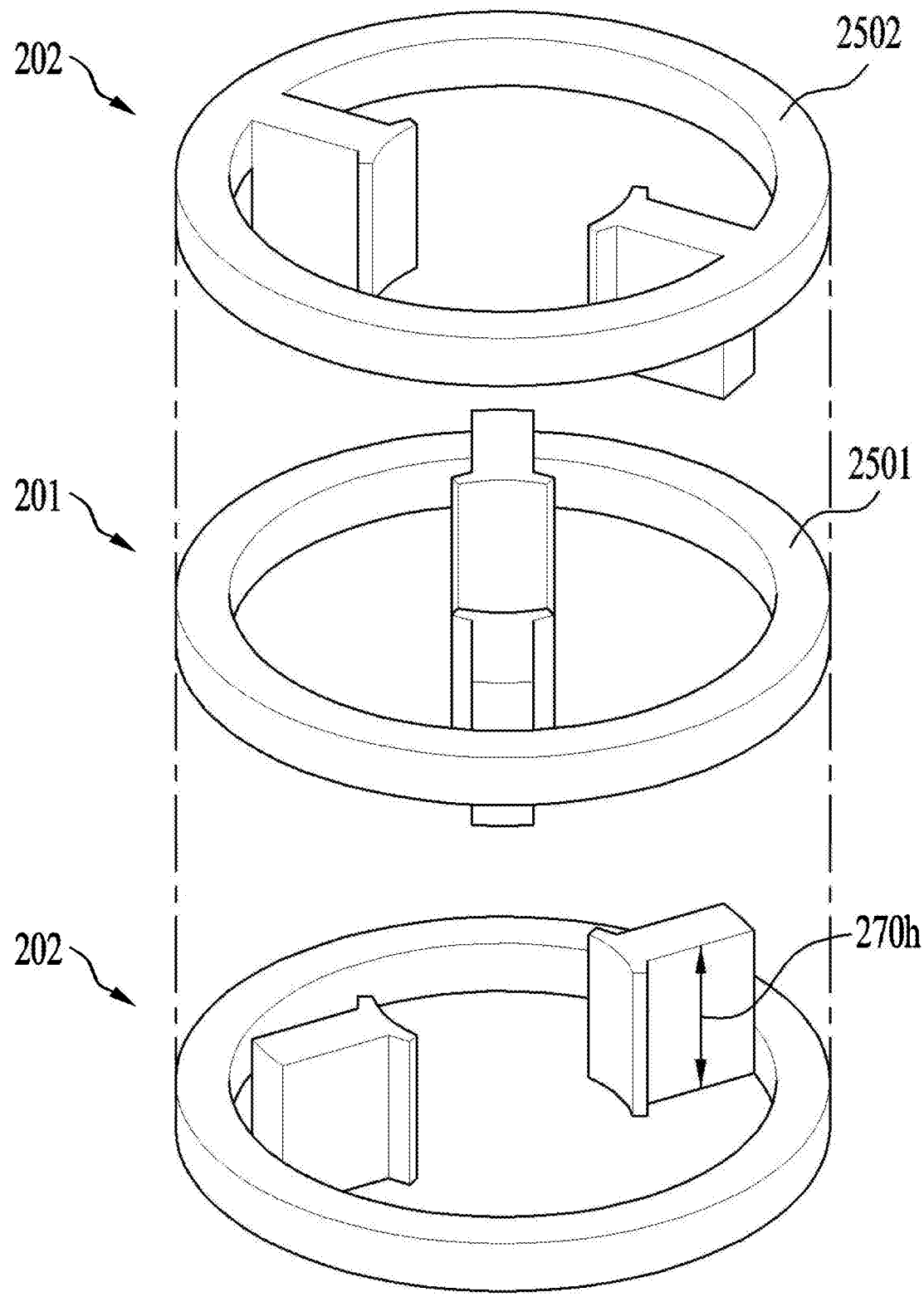
FIG. 10 is a perspective diagram of a divided core according to another embodiment.

FIG. 10 is a perspective diagram of a divided core according to another embodiment of the present disclosure.

Referring to FIG. 10 the user is able to form a plurality of teeth in one unit core according to requirements.

Specifically, the first core segment 201 and the second core segment 202 may have the teeth extending towards an inner area with respect to a radial direction of the back yoke at intervals of 180 degrees. The height (250$h$) of the back yoke according to this embodiment may be a third of the height of the stator formed by coupling the core segments. The height (270$h$) of the teeth may be equal to the height of the stator.

When six teeth are formed in the stator core of the 3-phase power motor according to the user's demands, three divided core segments having two teeth for each phase may be coupled.

According to this embodiment, each phase for the core segment 3-phase is formed and three core segments may be provided. Each core segment has the teeth projected towards the radial inside of the back yoke. The teeth may be projected in the positions in which they are able to face each other, spaced a 180 degrees distance apart from the back yoke.

In addition, the teeth provided in each core segment may be higher than the back yoke provided in each core segment. Each of the core segments may be formed of the multilayered unit cores as mentioned above or one core.

However, the back yoke 2502 of the second core segment 202 may be formed in the end of the height of the teeth in a circular shape. The back yoke 2501 of the first core segment 201 may be formed in a middle area of the height of the teeth in the circular shape.

Specifically, the first core segment 201 may be located in a middle area of the stator core. The second core segment 202 may be disposed on one side and the other side of the first core segment 201 to form the stator core.

Here, one side and the other side may mean a top and a bottom of the first core segment 201 shown in the drawing as mentioned above. However, during the process of manufacturing the stator core, a central axis of the first core segment 201 is located in parallel with the ground and the second core segment 202 may be coupled to right and left sides of the first core segment 201 after that.

Hence, the second core segment 202 may be disposed on one side and the other side of the first core segment 201 so as to form the stator core. Accordingly, the back yoke 2501 of the first core segment 201 may be formed in the middle area of the back yoke provided in the stator core.

Accordingly, the back yoke 2501 of the first core segment 201 may be formed in the middle longitudinal area of the teeth provided in the first core segment 201 in the circular shape. The other area of the teeth may be in contact with an inner surface of the back yoke provided in the second core segment 202.

The back yoke 2502 of the second core segment 202 may be formed in the longitudinal end of the teeth provided in the second core segment 202 in the circular shape. In other words, the second core segments 202 disposed on one side and the other side of the first core segment 201 may be fabricated in the same shape.

Here, it is preferred that the heights 270$h$ of the teeth provided in each core segment are equal. The heights 270$h$ of the teeth may be corresponding to the height of the stator core formed by disposing the core segments.

Meanwhile, when the structure of the embodiment is applied to the motor for the single phase power, the stator core may be formed by disposing two second core segments without the first core segment mentioned above.

More specifically, in case the motor for the single phase power, the core segment may form each phase of the motor for the single phase power and include two or more core segments having divided teeth that are disposed on one side of the main teeth. In case of the single phase 2-pole motor, each core segment may be formed of one set of the teeth. In case of the single phase 4-pole motor, each core segment may be formed of two sets of the teeth.

In this instance, the height of the back yoke provided in the core segment may be a half of the overall height of the stator core. The height of the multilayered divided and main teeth may be corresponding to the overall height of the stator core.

Specifically, while the core segment corresponding to each phase has to be provided and multilayered in the 3-phase motor, a corresponding number of teeth sets have to be provided in the back yoke of the core segment provided in the single phase motor and the core segments may be multilayered to form the stator core.

In case of the single phase motor, the core segments having the identical shapes (preferably, two core segments) may be fabricated and in case of the single phase 2-pole motor, the teeth sets may be arranged at intervals of 180 degrees along the circular back yoke so as to form the stator core. In case of the single phase 4-pole motor, the teeth may be disposed along the circular back yoke at intervals of 90 degrees to form the stator core.

In other words, the core segments may be manufactured in the identical shapes, different from the 3-phase power motor.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A stator of a motor, the stator comprising:
a stator core comprising a plurality of core segments that are configured to define each phase of a 3-phase power motor or a single phase power motor and that are arranged along an axial direction of the stator core, each of the plurality of core segments comprising:
a back yoke that surrounds one of the plurality of core segments,
a tooth that extends from an inner circumferential surface of the back yoke along a radial direction of the back yoke, and
an insulator that surrounds at least a portion of the tooth,
wherein the teeth of the plurality of core segments overlap with one another in the axial direction based on the plurality of core segments being arranged along the axial direction of the stator core, wherein each of the teeth of the plurality of core segments includes:
  a main tooth that extends from the inner circumferential surface of the back yoke, and
  divided teeth that are disposed on at least one of an upper side or a lower side of the main tooth in the axial direction,
wherein a total height of the main tooth and the divided teeth defines a height of the stator core in the axial direction,
wherein the stator core has a cylindrical shape having a recessed area,
wherein the back yoke of each of the plurality of core segments includes (i) an inner flat portion that is disposed at a connecting area of the inner circumferential surface of the back yoke connected to the teeth and (ii) an outer flat portion that defines the recessed area of the stator core and is disposed at an area of an outer circumferential surface of the back yoke corresponding to the connecting area, and
wherein the insulator includes (i) a planar portion that faces the inner flat portion and (ii) a bent portion that is bent along the inner circumferential surface of the back yoke.

2. The stator of claim 1, further comprising coils that are wound around the main tooth and the divided teeth of each of the plurality of core segments,
wherein a height of the main tooth and the divided tooth is greater than a height of the back yoke in the axial direction of the stator core.

3. The stator of claim 1, wherein a total height of the teeth of the plurality of the core segments defines the height of the stator core in the axial direction.

4. The stator of claim 1, wherein a height of the main tooth defines a height of the back yoke in the axial direction.

5. The stator of claim 1, wherein the plurality of core segments comprise:
  a first core segment having the divided teeth disposed on both of the upper side and the lower side of the main tooth; and
  second core segments each having the divided teeth disposed on one of the upper side or the lower side of the main tooth, and
  wherein the state core comprises two or more of the second core segments that are disposed on different side surfaces of the first core segment along the axial direction.

6. The stator of claim 5, wherein a total height of the first core segment and the second core segments defines the height of the stator core in the axial direction.

7. The stator of claim 5, wherein one of the second core segments is disposed on an upper side of the first core segment and another of the second core segments is disposed on a lower side of the first core segment.

8. The stator of claim 5, wherein the teeth of the first core segment are configured to, based on the plurality of core segments being stacked on one another along the axial direction, be arranged about a center axis of the stator core with a predetermined interval, and
  wherein the inner circumferential surfaces of the back yokes define the inner circumferential surface of the stator core based on the plurality of core segments being stacked on one another along the axial direction.

9. The stator of claim 1, wherein a portion of the main tooth or the divided tooth of one of the plurality of core segments protrudes from at least one of an upper surface or a lower surface of the back yoke, and is configured to insert into another of the plurality of core segments.

10. The stator of claim 1, wherein the insulator extends in the axial direction along the plurality of core segments.

11. The stator of claim 1, wherein the insulator extends away from a first side of the main tooth and a second side of the main tooth in a circumferential direction along the inner circumferential surface of the back yoke.

12. The stator of claim 1, wherein a radial distance from a center of the back yoke to the outer flat portion is less than a radius of the back yoke defined by the outer circumferential surface of the back yoke with respect to the center of the back yoke.

13. A divided core of a motor, the divided core comprising:
  a stator core comprising a plurality of core segments that are stacked on one another in an axial direction of the stator core, each of the plurality of core segments comprising:
    a back yoke that surrounds one of the plurality of core segments,
    a tooth that extends from an inner circumferential surface of the back yoke along a radial direction of the back yoke and that protrudes from the back yoke in the axial direction of the stator core,
    an insulator that surrounds at least portion of the tooth, and
    coils that are wound around the insulator, wherein the insulator is configured to insulate the tooth from the coils,
  wherein a height of the tooth is greater than a height of the back yoke in the axial direction,
  wherein each of the teeth of the plurality of core segments includes:
    a main tooth that extends from the inner circumferential surface of the back yoke, and
    divided teeth that are disposed on at least one of an upper side or a lower side of the main tooth in the axial direction,
  wherein a total height of the main tooth and the divided teeth defines a height of the stator core in the axial direction,
  wherein the stator core has a cylindrical shape having a recessed area,
  wherein the back yoke of each of the plurality of core segments includes (i) an inner flat portion that is disposed at a connecting area of the inner circumferential surface of the back yoke connected to the teeth and (ii) an outer flat portion that defines the recessed area of the stator core and is disposed at an area of an outer circumferential surface of the back yoke corresponding to the connecting area, and
  wherein the insulator includes (i) a planar portion that faces the inner flat portion and (ii) a bent portion that is bent along the inner circumferential surface of the back yoke.

14. The divided core of claim 13, wherein a total height of the teeth of the plurality of core segments defines the height of the stator core.

15. The divided core of claim 14, wherein the bent portion extends along a portion of the inner circumferential surface of the back yoke,
  wherein a height of the bent portion corresponds to a height of the main tooth or the divided tooth of each of the plurality of core segments in the axial direction, and wherein the bent portion is configured to insulate the coils from the inner circumferential surface of the stator core.

16. The divided core of claim 13, wherein a height of the main tooth corresponds to the height of the back yoke.

17. The divided core of claim 13, wherein the plurality of core segments comprise:
- a first core segment having the divided teeth disposed on both of the upper side and the lower side of the main tooth; and
- second core segments each having the divided teeth disposed on one of the upper side or the lower side of the main tooth, and
- wherein the stator core comprises two or more of the second core segments that are stacked along the axial direction on different side surfaces of the first core segment.

18. The divided core of claim 17, wherein a total height of the first core segment and the second core segments defines the height of the stator core in the axial direction.

19. The divided core of claim 17, wherein one of the second core segments is disposed on an upper side of the first core segment and another of the second core segments is disposed on a lower side of the first core segment.

20. The divided core of claim 13, wherein the teeth of the plurality of core segments are configured to, based on the plurality of core segments being stacked on one another along the axial direction, be arranged about a center axis of the stator core with a predetermined interval, and
wherein the inner circumferential surfaces of the back yokes define the inner circumferential surface of the stator core based on the plurality of core segments being stacked on one another along the axial direction.

* * * * *